United States Patent
Sun et al.

(10) Patent No.: US 12,194,453 B2
(45) Date of Patent: Jan. 14, 2025

(54) DEVICE FOR DISTRIBUTING GAS IN A GAS PROCESSING VESSEL COMPRISING A PARTICULATE MATERIAL

(71) Applicant: L'Air Liquide, Société Anonyme pour l'Etude et l'Exploitation des Procédés Georges Claude, Paris (FR)

(72) Inventors: Lian-Ming Sun, Villebon-sur-Yvette (FR); Christian Monereau, Montpellier (FR); Gregory Demar, Villiers-sur-Marne (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 434 days.

(21) Appl. No.: 17/617,256

(22) PCT Filed: Jun. 2, 2020

(86) PCT No.: PCT/EP2020/065157
§ 371 (c)(1),
(2) Date: Dec. 7, 2021

(87) PCT Pub. No.: WO2020/245092
PCT Pub. Date: Dec. 10, 2020

(65) Prior Publication Data
US 2022/0226794 A1    Jul. 21, 2022

(30) Foreign Application Priority Data
Jun. 7, 2019    (FR) ...................................... 1906107

(51) Int. Cl.
*B01J 8/02*    (2006.01)
*B01D 53/04*    (2006.01)
*B01D 53/047*    (2006.01)

(52) U.S. Cl.
CPC .......... *B01J 8/025* (2013.01); *B01D 53/0446* (2013.01); *B01D 53/0462* (2013.01);
(Continued)

(58) Field of Classification Search
CPC .............. B01J 8/025; B01J 2208/00672; B01J 2208/0092; B01J 2208/00938;
(Continued)

(56) References Cited

U.S. PATENT DOCUMENTS 2,657,121 A * 10/1953 Rollins ................... B01J 8/0278
                                                                      422/220
5,779,773 A * 7/1998 Cam ....................... B01J 8/0453
                                                                      55/494
(Continued)

FOREIGN PATENT DOCUMENTS

| EP | 0 719 578 | 7/1996 |
|---|---|---|
| FR | 2 750 617 | 1/1998 |
| WO | WO 2016 133984 | 8/2016 |

OTHER PUBLICATIONS

International Search Report for corresponding PCT/EP2020/065157, Aug. 4, 2020.

*Primary Examiner* — Robert A Hopkins
*Assistant Examiner* — Qianping He
(74) *Attorney, Agent, or Firm* — Elwood L. Haynes (57) ABSTRACT

A gas processing vessel of cylindrical shape having a cylindrical shell of the vertical axis, a gas distribution device and a first particulate material, the distribution device being fixed in the vessel next to a gas inlet or outlet orifice recessed into a lower end wall, a cover being designed to be in contact without a weld with the lower end wall and having a diameter greater than or equal to one third of the diameter of the vessel, a second particulate material with an equivalent diameter De greater than or equal to 10 mm and greater than the dimensions of the openings in the cover, and a means for (Continued)

centering the cover above the inlet or outlet orifice, the means being fixed to the pipe that is connected to the orifice.

9 Claims, 4 Drawing Sheets

(52) U.S. Cl.
CPC ... *B01D 53/047* (2013.01); *B01J 2208/00672* (2013.01); *B01J 2208/0092* (2013.01); *B01J 2208/00938* (2013.01)

(58) Field of Classification Search
CPC ............ B01J 2208/00884; B01J 8/0453; B01J 2208/025; B01J 2208/0084; B01J 2208/00991; B01J 8/1872; B01D 53/0423
USPC .......................................................... 96/152
See application file for complete search history.

(56) References Cited

U.S. PATENT DOCUMENTS

| | | | |
|---|---|---|---|
| 5,873,929 A | | 2/1999 | Andreani et al. |
| 5,891,405 A | * | 4/1999 | Bianchi .................. B01J 8/0453 |
| | | | 277/650 |
| 2005/0155492 A1 | * | 7/2005 | Baksh ................ B01D 53/0431 |
| | | | 96/135 |

* cited by examiner

DEVICE FOR DISTRIBUTING GAS IN A GAS PROCESSING VESSEL COMPRISING A PARTICULATE MATERIAL

CROSS REFERENCE TO RELATED APPLICATIONS

This application is a 371 of International Application No. PCT/EP2020/065157, filed Jun. 2, 2020, which claims priority to French Patent Application No. 1906107, filed Jun. 7, 2019, the entire contents of which are incorporated herein by reference.

BACKGROUND

The present invention relates to a device for distributing gas in a gas processing vessel comprising a first particulate material. This distribution device makes it possible to keep in position the particulate medium subjected to gravity and to the stresses that result from the movements of the fluid and also to participate in the proper distribution of this fluid across the entire section of the vessel.

In industrial installations, it is common to use cylindrical vessels with a vertical axis that contain an active material, catalyst or adsorbent, for processing gaseous fluids. These are reactors in the first case and adsorbers in the second case.

The problem of holding the reactive material and of uniformly distributing the fluid across the latter has been the subject of numerous publications that described various solutions.

Among the issues to be solved in order to have a reliable and well-performing system, there are, of course, the mechanical stability of the support itself, its fixing in the adsorber, the risks of excessive local mechanical stresses, the consideration of thermal stresses, the risks of local corrosion due to obstacles to the flow or stagnant points, the presence of liquid, the problems associated with the tightness of the system with regard to particles, the risks of clogging, etc. As far as distribution is concerned, the risks of too fast or too slow flow rates associated with the geometry of the system, local excessive speeds that can bring about erosion or attrition of the particles, etc., may be mentioned. The negative effect in a large number of processes, in particular in the case of cyclical processes such as processes for separation or purification by adsorption of the TSA and PSA type in the broadest sense of the terms, of the free volume left for the fluid under the active material (dead volume), which therefore needs to be minimized, may also be noted. The consideration of the risks associated with process-related incidents such as excessively rapid pressurization or depressurization, which can result in significant excess stresses compared with normal operation, can be added to this.

Note that, in the existing solutions, the mechanical integrity of the lower end wall is not preserved, said solutions proposing, by contrast, that the distributor be welded to the end wall (the fact of welding the distributor to the end wall allows it to be secured to the latter and as a result makes it possible to avoid any relative movement, whatever may happen). The mechanical integrity of the end wall is intended to mean, in this document, that the end wall does not, in this case, have any weld or any machining (grooving, drilling, etc.) at least in the area of contact between the distribution device and the end wall and preferably over the entire end wall between its junction with the shell and its junction with the outlet tube. Specifically, a weld or machining in this area of contact may cause metallurgical problems such as cracks on account, in particular, of the fatigue associated with the pressure or temperature cycles, with for example a high pressure greater than 50 bar abs and a low pressure of a few bar or a maximum temperature greater than 300° C., whereas, for other steps, the operating temperature will be close to ambient temperature. Some units of the TSA type may combine these two effects of metallurgical fatigue caused by pressure and temperature cycling.

On this basis, a problem that arises is to provide a distribution device that allows uniform distribution of the gas while maintaining the active material and preserving the mechanical integrity of the lower end wall.

SUMMARY

One solution of the present invention is a gas processing vessel of cylindrical shape with a vertical axis, comprising a cylindrical shell of vertical axis, an upper end wall, a lower end wall, an inlet orifice, an outlet orifice, a gas distribution device and a first particulate material, the distribution device being fixed in said vessel next to the gas inlet or outlet orifice recessed into the lower end wall, the distribution device comprising:
- a gas-permeable cover covering said orifice and having a wall with a substantially circular base, the cover being designed to be in contact without a weld with the lower end wall and having a diameter greater than or equal to one third of the diameter of the vessel,
- a second particulate material with an equivalent diameter De greater than or equal to 10 mm and greater than the dimensions of the openings in the cover, the second particulate material being accommodated around the cover at least to a height corresponding to the upper end of the cover, and
- a means for centering the cover above the inlet or outlet orifice, said means being fixed to the pipe that is connected to the orifice.

A cover is understood here to be a rigid system creating a free volume around the orifice that it covers. In the general case, with the end wall of the vessel being domed (hemispherical end wall, elliptical end wall, flat end wall with a lip), the cover will have a concavity opposite to that of the end wall of the vessel. This is a three-dimensional (3D) system which excludes any flat device, of the disk type, for reasons of mechanical stability. This point will be returned to later.

A "substantially circular" base is intended to mean firstly that the cover will preferably have an axisymmetric shape, its axis being coincident in the vast majority of cases with that of the vessel and with that of the orifice. This geometry will preferably be retained for reasons of better mechanical stability and ease of production. The most common examples of this type of cover will be found below. The intersection of an axisymmetric shape with the end wall of the vessel is theoretically a circle provided that their respective axes of symmetry are coincident. The term "substantially" circular is intended, for its part, to cover,
  for the one part, the differences with respect to geometric ideality on account of the manufacturing tolerances of the distribution device, of the shell of the vessel, of the end wall and of the imperfect alignment of the axes of the vessel, of the orifice, and of said distribution system,
  for the other part, a number of very particular cases in which the cover has a slightly ellipsoidal section (associated for example with the presence, by the inlet/outlet tube, of a drain intended to be housed in the device).

Such particular features are not described here but remain within the spirit of the invention when the intention is to preserve the mechanical integrity of the end wall of the adsorber.

Where it is specified that the base is in contact with the end wall, this is intended to indicate that there is effective contact between the two pieces of equipment such that the distribution device bears stably on the end wall.

Surprisingly and in contrast to the known prior art, the lack of a weld has no perceptible impact on the immobilization of the cover with respect to the end wall, in spite of the forces of pressure, temperature and the circulation of the fluid (the immobilization is ensured by the centering means combined with the weight of the particulate material). The invention makes it possible to limit the risks of the occurrence of cracks in the area of contact between the cover and the lower end wall. Specifically, a weld may locally constitute a specific area having particular properties associated in particular with gas pockets (bubbles of gas trapped in the metal) or inclusions (fragments of oxides), or with undercuts (local modifications caused by excessive energy during welding), etc. These specific areas, combined, for the one part, with what is known as a "fatigue" effect (variations associated with the change in pressure and/or temperature of a PSA or of a TSA) and, for the other part, with what is known as the "hydrogen embrittlement" effect (hydrogen makes the metal brittle), can initiate cracks.

Depending on the case, the device according to the invention may have one or more of the following features:
- the vessel comprises two pipes connected to the upper end wall and to the lower end wall, respectively, preferably, at least for the pipe connected to the lower end wall, via a junction piece welded on either side to the lower end wall and to the pipe.
- the inside diameter of the shell is between 0.5 m and 6 m.
- the cover has a wall, the base of which has a diameter greater than or equal to half the diameter of the vessel.
- the second particulate material has an equivalent diameter De greater than or equal to 25 mm.
- the second particulate material is accommodated above the cover at least to a height greater than or equal to the height of the cover plus 50 mm.
- the second particulate material may be identical to the first particulate material provided that the latter has an equivalent diameter of at least 10 mm.
- the cover is either in the form of a cone, or in the form of a spherical cap, or in the form of a truncated cone with the face facing the inlet or outlet orifice being substantially horizontal, or in the form of a cylinder with the face facing the inlet or outlet orifice being substantially horizontal.
- the cover has a wall, the base of which has been machined such that the contact between the cover and the lower end wall of the vessel is not point contact.
- the contact between the cover and the end wall is achieved along at least 50% of the length of the base of the cover, preferably along at least 80% and more preferably along more than 95% of this length.

This maximizes the bearing area of the cover on the end wall in order to limit the mechanical stresses. It will not generally be equal to 100% on account of local clearances that can result from the manufacturing tolerances or are created deliberately for the removal of any dust or liquids. A slightly elastic seal could be inserted between the edge of the cover and the end wall, but this arrangement, which introduces an additional element, would only be resorted to a priori in the case of excessive tolerances.

- the cover has a variable percentage of perforation with a percentage that can vary between 0 and 60% depending on the location on the cover, or a constant percentage chosen between 5 and 40%.

A constant percentage of perforation is intended to mean that the entire surface of the cover, possibly apart from the lower strip that will provide contact with the end wall, is perforated with an identical void percentage, for example 35%. By contrast, the percentage of perforation can be adapted depending on the geometry, with the section facing the opening being perforated only to a percentage of 5% up to a percentage of 60% in the part close to the base. Fluid mechanics calculations make it possible to test different approaches. The choice is generally a compromise between performance and complexity.

- the cover is covered with a metal lattice preferably made up of a grating surmounted by a gas-permeable flexible metal gauze; said gauze preferably extends onto the end wall, along a length of around 10 to 50 mm, in order to ensure, at this level, tightness with respect to particles with a size greater than a few hundred micrometers.
- the centering means is made up of a rod, the upper end of which is fixed to the cover, and of a means for maintaining said rod at the center of the pipe.
- said device comprises a deflector positioned in a horizontal position in the free volume between the cover and the lower end wall of the vessel.
- the deflector has a circular shape with a diameter Dd greater than or equal to the diameter of the inlet or outlet orifice.
- said device comprises a free space between the deflector and the cover; the deflector could optionally have, at least locally, openings allowing the fluid to pass toward the free volume situated above it.

A further subject of the invention is a unit for purifying or separating gases by adsorption of the PSA or TSA type, comprising at least one adsorber employing a vessel as described above.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 1A:
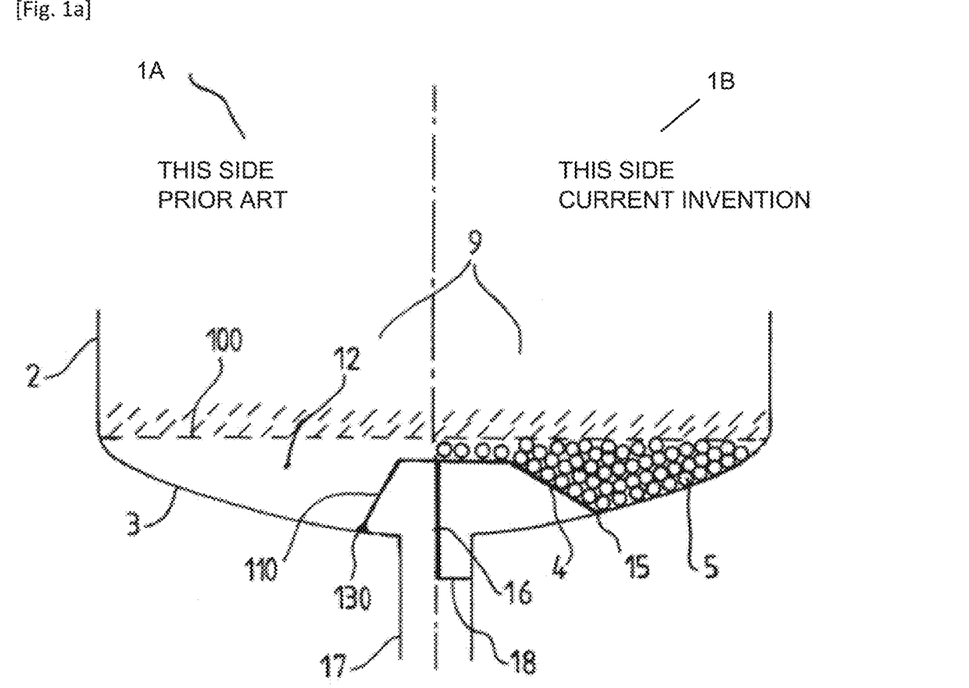
FIG. 1a Is a schematic representation of one embodiment as known in the prior art.

With regard to FIG. 1a, the left-hand side of the diagram corresponds to the prior art and the right-hand side to the solution proposed herein. A vessel 1 has a cylindrical shell 2 and, in its bottom part, a lower end wall 3, of elliptical type in this example. An inlet/outlet tube 4 is positioned in the lower part of the end wall. In the prior art solution, a frustoconical distributor 110 is surmounted by a grating 100 which itself holds the active particulate medium 9. The space between the distributor 110 and the support grating 100 is essentially empty and allows proper distribution of the flows even with a distributor having a small diameter at the base. The grating is either welded to the shell or supported by gusset plates (not shown here) bearing on the end wall. It is this grating that supports the stresses associated with the weight of the bed and with the circulating flows. The distributor 110 is subjected only to the forces associated with its being passed through by the fluid. Nevertheless, it needs to be held in place, this being done by a weld on the end wall in the region of its base 130 that is at a greater or smaller distance from the connection of the end wall to the tube.

By comparison, on the right-hand side, the cover 4 of the distribution support of the proposed solution has a much more extensive side wall. The diameter of its base section 15, in contact with the end wall 3, is at least equal to one third of the diameter of the shell and preferably at least equal to half this diameter. The path of the gas exiting through the lower orifices of the distributor is substantially shorter than in the previous case and it is possible to fill the space around the cover with a second particulate material 5 at least as far as its upper part, or even above it, for example as far as the tangent point between the end wall and shell, as shown here. It is then possible to place horizontal layers of active materials 9 (first particulate material) on top. Between the different layers of particulate materials, separating gratings or gauzes will be installed, if this is deemed necessary, in order to avoid any mixing between layers of different natures. The decision takes into account the physical characteristics of the different materials (size, density, shape) but also other aspects such as the probability of incidents (for example risks of too fast a flow rate) or the emptying and filling procedures (for example collection of a material without risk of mixing). The vertical stresses associated with the weight of the materials and with the circulating flows are applied in part directly to the end wall, and in part to the distributor support, which retransmits them to the end wall via its bearing surface 15. Note that the bearing takes place all along a relatively long diameter and not in a more point-wise manner as in the case of gusset plates or support feet. The system is naturally held in place by the particles 5 of the second particulate material which surrounds it and, for safety, requires only a simple centering guide, for example a rod 16, which is itself held at the center of the inlet/outlet tube 17 by a suitable system that does not cause any substantial restriction to the passage of the flows, for example 3 lugs 21 at 120° that are welded to the pipe 18. The dimensions used for the device, namely, in this example, a frustoconical distributor defined by its upper section, its base and its height (or the angle of the cone), are a compromise between distribution of the fluid and mechanical stability of the device. A base of large size for example may favor the distribution of the gas, but to the detriment of the mechanical stability of the side wall. Conversely, a system of small size will be mechanically strong but will impose distribution constraints such as the use of particles of large size (50 mm or more) in the lower part and greater distribution heights. A base diameter of the distributor of between ⅓ and ⅔ of the diameter of the vessel is a good approach for a first size, the completion of which will be economical.

As a result, the lower end wall 3 does not have any weld or any machining that is likely to weaken its mechanical stability. It is said in this case to preserve its entire mechanical integrity.

This point, which has already been addressed, is particularly important since a large number of these vessels are used in processes that are very demanding from the point of view of mechanical stability. These may be adsorption processes of the PSA type in the broad sense covering the range of pressures from more than 50 bar abs to a vacuum of less than 200 millibar abs and encompassing what is traditionally known as PSA, VPSA and VSA; they may also be processes of the TSA type, in which it is common to use regeneration temperatures that go above 200° C. Since these are cyclical processes, the adsorbers are permanently subjected to variations in pressure and/or temperature which fatigue the materials used. A TSA unit may exceed 4000 temperature cycles per year while a PSA unit may, for its part, go beyond 500,000 pressure cycles per year. The presence of moisture, of more or less corrosive products, of gas such as hydrogen, which tends to diffuse in steels, worsen these fatigue phenomena. It is well known that cracks and more generally defects then start in the singular points that are the welds and the various machinings. Eliminating all of these singular points, in particular at the locations where the end wall is subjected to greater stresses, such as the bearing surfaces, will make it possible to substantially lengthen the lifetime of the equipment, to possibly use smaller thicknesses, and to do away with or space apart expensive periodic examinations.

Similarly, numerous catalysis reactors are subjected to very high pressures (>50 bar abs) and/or to temperatures greater than 300° C. Here too, the elimination of the singularities that are the welds or the machinings in order to respect the integrity of the end walls may be of great advantage.

The use of particles with an equivalent diameter greater than or equal to 10 mm, or even greater than or equal to 25 mm, for the second particulate material, allows the fluids to circulate easily through them and to be distributed through the entire section of the vessel. These particles will generally be inert support particles, for which several specialist suppliers exist, but could also be an active material chosen with an especially large diameter. Besides the fact that these particles maintain the beds of adsorbents or of catalyst placed on top, they reduce the free volume in the bottom of the adsorber or of the reactor, which is generally detrimental to the process, resulting for example in a decrease in the extraction efficiency of the PSA units. As a reminder, the diameter of the active particles (first particulate material), in particular if an adsorbent is concerned, is generally in the range from 5 to 0.5 mm, and mostly between 3 and 0.7 mm. A material having such dimensions would limit the radial distribution of the fluid toward the periphery and would result in local too slow flow rates.

The first particulate material and the second particulate material may be separated via the use of different successive granulometries preventing any interpenetration of the layers or through the use of perforated gauze disposed between successive layers. This point, which is well known to a person skilled in the art, will not be addressed further here.

Figure 1B:
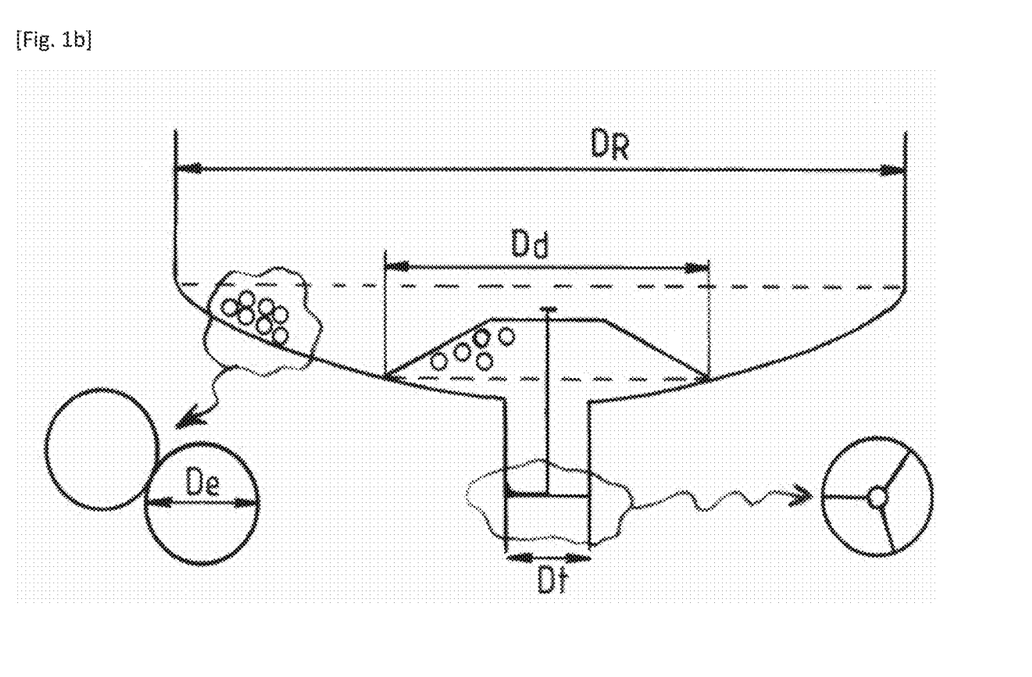
FIG. 1b is another schematic representation as known in the prior art.

FIG. 1*b* shows a gas distributor according to the invention with a Dd/Dr ratio of 0.43, inert support beads with a diameter of 50 mm (second particulate material) covering the gas distributor, and a centering guide fixed to the tube by 3 lugs at 120°, the detail of which, in horizontal cross section, is shown in the right-hand sketch. The end wall, in this case of the elliptical type, is welded to the shell on one side and to the tube on the other. It has preserved its mechanical integrity, in particular in the bearing zone of the distributor support.

Such a distributor has been described more generally as having a substantially horizontal surface facing the inlet/outlet tube and a side wall bearing on the end wall. Specifically, while a frustoconical gas distributor as chosen here has the advantages of being simple, stable and having an axis of symmetry that is coincident with that of the vessel and therefore favorable to good distribution, other variants are of course possible, such as pyramid frustums, for example. The upper face is said to be substantially horizontal since this is the simple usual geometry used for a jet break. Here too, it is possible to use slightly more complex forms without changing the concept of the invention.

It will be noted that use is made of covers having a concavity (opposite to that of the end wall), excluding for example from the scope of the invention a flat circular plate which would also rest on the end wall by way of its peripheral end. Such a perforated flat plate has a much lower mechanical strength than the solutions used here, namely a frustoconical shape and a spherical cap. It will very generally require stiffeners, installed in a star shape or in parallel, which will have a negative effect on the distribution of the fluids and/or create local stresses. Nevertheless, a flat plate solution is possible for vessels of small diameter, or for small loads, for example a thin layer of active material placed on top and little in the way of stresses associated with the circulation of the fluids. In other cases, its intrinsic mechanical stability would result in unrealistic thicknesses and weights. The solution recommended here is more general and more secure both for mechanical stability and for the proper distribution of the fluids.

Figure 2A:
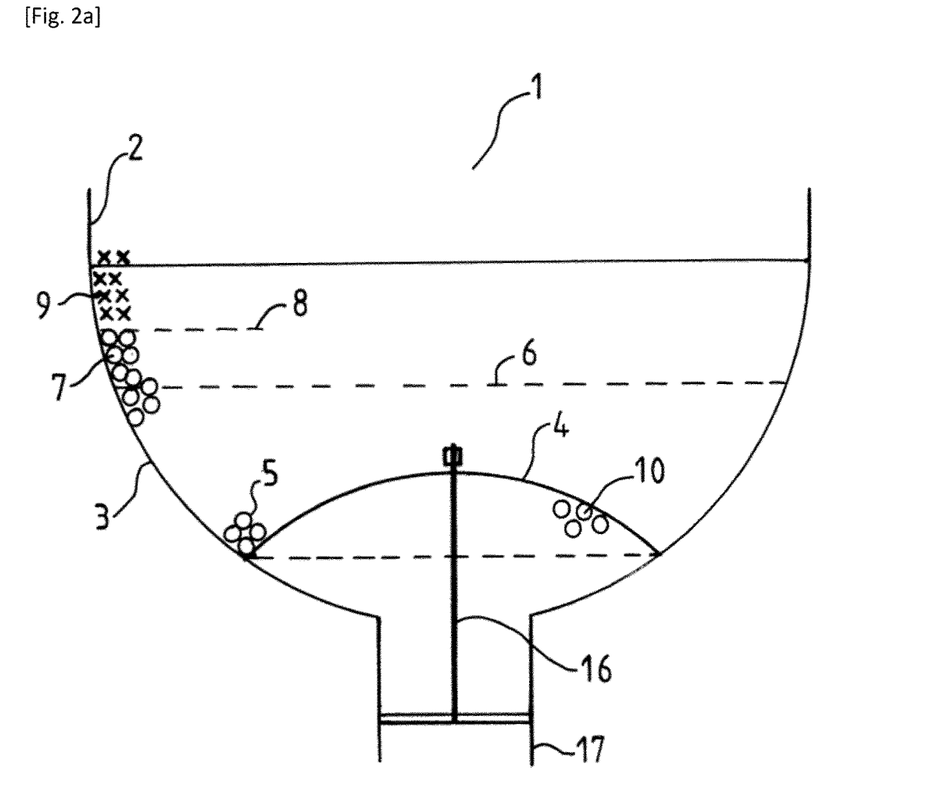
FIG. 2a is a schematic representation of a gas distributor in accordance with one embodiment of the present invention.

FIG. 2*a* corresponds to a gas distributor according to the invention with a cover in the form of a spherical cap in a vessel 1 having a lower end wall of hemispherical type 3 welded to the shell 2. The cover 4 is surmounted by inert beads 5 with a diameter of 25 mm that reach as far as a section 6 of about 85% of the section of the shell. On top of this layer, there is disposed directly another layer 7 of inert beads with a diameter of 10 mm, a metal gauze 8 with an opening size of 0.7 mm, and then the active material 9, in this case for example an adsorbent with a mean granulometry of 1.8 mm with less than 2% by weight of particles smaller than 1.0 mm. Note that the inert beads 5 and 7 constitute the second particulate material in the present case. As a result, no penetration is possible between the different successive layers apart from debris that may arise (broken particles, welding residue, etc.).

Figure 2B:
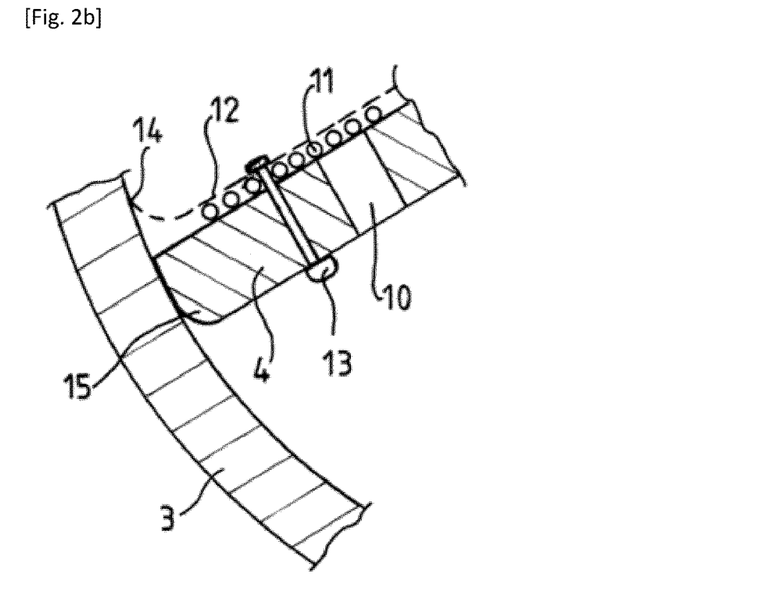
FIG. 2b is a schematic representation illustrating some details in accordance with one embodiment of the present invention.

The cover 4 has a constant percentage of free passage of around 35% created by holes 10 with a diameter of 10 mm. In order that these holes cannot be at least partially clogged by the inert support beads, it is covered with a metal grating 11 having threads with a diameter of 1 mm, itself covered by a flexible metal gauze 12 having threads of 0.3 mm. The detail FIG. 2*b* shows these various elements 11, 12 held by rivets 13 and also the tightness 14 to fine particles at the periphery. This system constitutes security with respect to various debris (broken particles, welding fragments, grinding residue, etc.) which could infiltrate through the various layers, as indicated above, and possibly accumulate in the bearing zone between the distributor support and the end wall. It also makes it possible to avoid clogging of passages intended for the possible flow of liquids. A metal gauze will be used, the opening of which will have a size of several hundred micrometers (from 100 to 500 micrometers, for example), and generally not finer so as to avoid clogging with dust.

The end 15 of the cover 4 is machined in order to improve the bearing thereof on the lower end wall 3 and to avoid any punching effect. Without this machining, there would be, a priori, a single point of contact with the end wall that may generate high local stresses. Other solutions may be implemented (seal, shoe, etc.) for reducing these local stresses as long as they do not make it necessary to provide welds or machinings on the end wall.

Figure 2C:
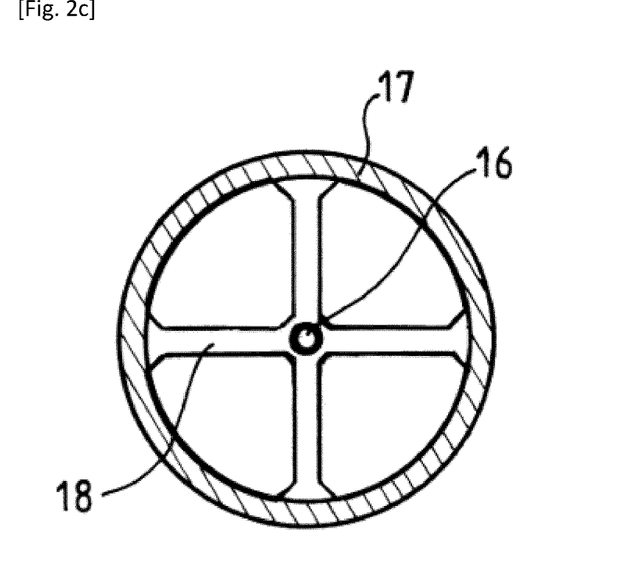
FIG. 2c is a schematic representation of the rod centering means in accordance with one embodiment of the present invention.

In this example, as is shown by the detail in FIG. 2*c*], the rod of the centering means 16 that makes it possible to center the cover 4 is held on the axis of the pipe 17 and of the vessel 1 by a cross-brace with 4 arms 18 that is welded on an inside diameter of the pipe.

As stated at the beginning, a certain number of dimensions or embodiment details are given here by way of example, the invention not being limited to these particular indications.

Figure 3:
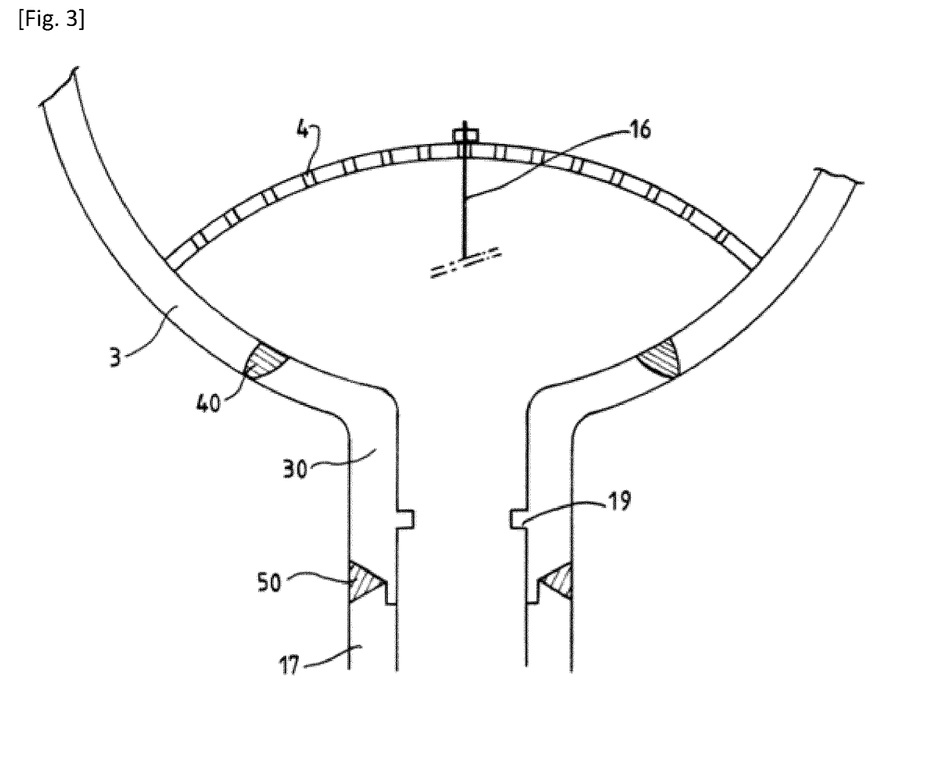
FIG. 3 is a schematic representation of one embodiment of the present invention.

With such an arrangement, the end wall of the vessel preserves its entire mechanical integrity, this being the main objective of the invention. As described above, the preservation of the mechanical integrity of the end wall has a number of advantages, in particular that of it being possible to use smaller thicknesses of material. Under these conditions, the junction between the end wall and the pipe may become the weak point of the system. For restrictive operating conditions (pressure and/or temperature cycles), it may be necessary, as shown in FIG. 3, to improve this junction by using a connecting piece 3 welded on one side to the end wall 3 of the vessel, the lower opening of which has been enlarged with respect to the diameter Dt of the pipe 17, and on the other side, in its vertical part, to the pipe. FIG. 3 shows the principle of this arrangement. It will be noted that the weld 40 between the lower part of the end wall and the junction piece is not in the bearing zone between the cover 4 and the end wall 3. A minimum distance of 20 mm and preferably of at least 50 mm will be respected. The centering means 16, which is not shown in its entirety, could be secured to the connecting piece, for example at its internal ring 19.

This connecting piece is made preferably from forged steel in order to maximize mechanical stability.

In practice, the weld 4 between the end wall and the junction piece is made along a diameter Dj, Dj generally being, depending on the respective dimensions of the tube, of the end wall and of the vessel, between 1.2 Dt and 4 Dt, Dt being the inside diameter of said pipe.

For large diameters of the shell of the vessel, for instance greater than 1.5 or 2.0 meters, the system described thus far may result in a fluid deficit at the periphery of the shell, at least at the start of the active material zone. This too slow a flow rate, even localized, may be unfavorable to the achievement of optimal performance in certain processes. This possible defect may be corrected by employing a deflector placed in the free volume between the end wall of the vessel and the cover, in line with the inlet/outlet tube.

Said deflector is preferably circular and its maximum diameter Dd is such that it is equal to or greater than the inside diameter of the tube Dt and leaves a free space for gas at its periphery. This space makes it possible for the fluid to supply the free volume situated above the deflector. A simple deflector in the form of a disk has been used in the rest of the description. Of course, other geometries are possible for this deflector, such as an inverted V shape, such as systems of the conditioned air diffuser type separating the fluid into several successive flow zones or other known geometries that are more or less complex. Said deflector may optionally have, at least locally, openings, for example a series of holes resulting in a percentage of perforation of 5 to 10%, allowing the direct passage of the fluid to the upper free volume.

Since this deflector is subjected only to the stresses associated with the circulation of fluids, it can be held in place by supports bearing on the end wall and/or on the junction piece. These supports, which are not welded to the end wall, may have different shapes.

Preferably, use will be made of 3 panels at 120° or two panels that cross orthogonally and are connected together over a common central height and form a sort of cross-brace. The deflector is then fixed horizontally, screwed for example orthogonally to the panels and therefore to the axis of the vessel and of its lower inlet/outlet tube. Also preferably, a part of these vertical panels will extend down into the tube or into the lower part of the junction piece, where they will be immobilized (welding, stopping or any other suitable means). It will be noted that, here too, there is no weld or machining made on the lower end wall of the vessel.

Since the central axis of the panels supporting the deflector is coincident with the axis of the vessel, it is also coincident with the axis of the centering guide of the distributor support. This guide can therefore have a centering purpose both for the panels and for the deflector.

Figure 4:
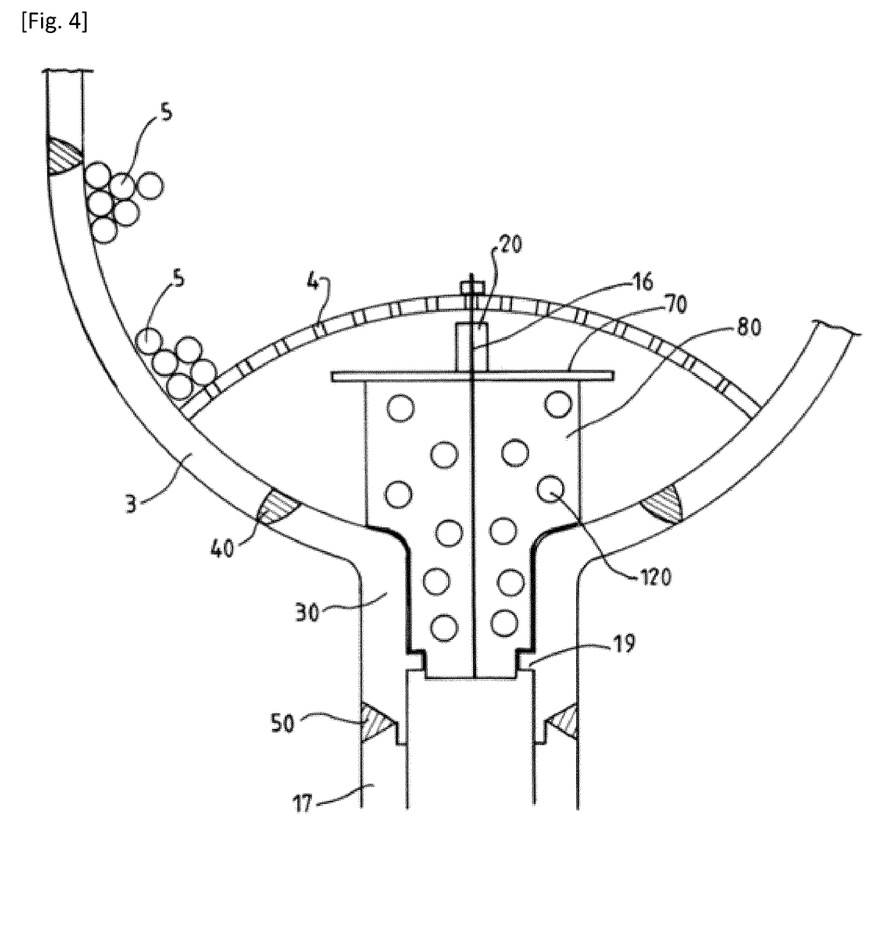
FIG. 4 is a schematic representation of one arrangement of the distributor support and deflector in accordance with one embodiment of the present invention.

In order to clarify the present description, one possible arrangement of the system comprising the distributor support and the deflector is given as an exemplary embodiment in FIG. 4.

The lower end wall 3, which is hemispherical in this example, is secured to the inlet/outlet tube 17 via the junction piece 30 made of forged steel. These elements are connected by circular welds 40 and 50.

For the sake of clarity, the inert support beads (second particulate material) are shown only locally 5, the first particulate material situated on top has not been shown and neither has the grating covering the cover 4. The deflector in the form of a disk 70 situated in line with the tube is held in place by 4 pieces of metal sheet 80 that have been cut so as to bear on the neck of the junction piece and to slide in the lower part into the ring 19 that represents a slight narrowing of the inside diameter of the junction piece.

The rod 16 (centering means) makes it possible to center the cover while it is being fitted and to hold it in this position. The metal sheets 80 that support the deflector 70 are fixed to this rod; by virtue of such an arrangement, it is embodied so as to be located on the axis of the vessel. The part 20, which has not been described thus far, is a small cylindrical tube which rests on the deflector and has a length such that there is a clearance, for instance of 5 to 10 mm, between its upper end and the cover. This tube has only a function of security in the event of abnormal operation. It would limit any raising of the deflector or would take up some of the forces in the event of abnormal stresses applied from top to bottom to the spherical cap.

It is preferable to effect the detailed design of the system using fluid mechanics software, at least initially, in order to determine the choice of the main parameters depending on the respective diameters of the shell of the vessel and of the inlet/outlet tube, on the type of end wall (elliptical, flat, semicylindrical, etc.), on the quality of distribution desired. Indeed, it will be understood that, without particular precautions, in particular in the absence of a deflector, the central part of the vessel, situated in line with the inlet/outlet tube would experience, on account of its position, too fast a flow rate compared with the mean flow rate and, by contrast, the peripheral zone would experience too slow a flow rate. Several means are used, as has been shown, to overcome these problems. The percentage of perforation of the cover may be variable, lower in its central part than toward the periphery. The role of the deflector is to orient the flow horizontally in order to direct it toward the periphery. It may nevertheless be somewhat perforated in order not to reduce the flow rate excessively on the axis of the vessel.

It has been shown that the inert support beads (second particulate material) have the aim both of holding the active material (first particulate material) and of reducing the dead volume between the cover and the bed of active material. Although the void percentage is, to a first reasonable approximation, independent of the diameter of the beads (and around 35%), beads—or particles—with a sufficiently large diameter will be used so as to create only small pressure drops. Besides the fact that the latter are often unfavorable to the processes, large pressure drops would slow the diffusion of the fluids toward the periphery. It will be understood, by contrast, that using larger particles makes stacking the successive layers more problematic, in particular the tightness with respect to the smallest particles. Use is commonly made of particles with an equivalent diameter of 25 mm (1") or 50 mm (2"). The diameter of the cover, its position with respect to the end wall, the position and the size of the deflector, the percentages of perforation, etc., also play an important part in the distribution and all of these parameters need to be chosen on an informed basis (experience, simulation, calculations of pressure drops, etc.).

In the case of our example, the diameter of the sphere corresponding to the cover is approximately equal to the diameter of the shell. It will generally be between 75 and 125% of this diameter. Its bearing circumference has a diameter of about 70% of that of the shell of the vessel. This value will generally be between 33 and 80%, preferably between 50 and 70%.

The cover is in this case widely perforated with a constant void percentage of around 35%. A high percentage is favorable to distribution, in particular toward the periphery. On the other hand, it weakens the mechanical stability and a compromise needs to be found. In the absence of a deflector, this percentage would be variable, around 5% at the center and 40% at the periphery of the cap.

The deflector is situated at about 70% of the available height between the bottom end of the lower end wall and the top end of the cover. The disk has a diameter equal to 2.5 times that of the tube, leaving a sufficient free section between its end and the spherical cap. The position of the deflector (height, diameter) depends very greatly on the type of end wall and on the geometry used for the distributor support. A scale diagram allows good initialization of the dimensions to be used, a fluid mechanics calculation being able to optimize these said dimensions, if necessary, as has already been described.

Support plates 80 for the deflector having orifices 120 are shown. Since the stream of the fluid is split at the inlet of the vessel into 4 sectors by this support, this would thus allow these flows to be rebalanced, if necessary. This could be the case when there is an elbow at a short distance from the inlet into the vessel.

It is possible to verify that the arrangement used includes the features of the invention, namely that the gas distributor has a cover installed such that its concavity is opposite to that of the end wall of the vessel, the circular lower edge of which, of diameter Dd, is in contact with the inner wall of the end wall, and also a centering means made up of a centering rod. The end wall of the vessel preserves all of its mechanical integrity in the zones of contact with the circumference of the cap bearing on this end wall. The contact diameter Dd is greater than or equal to one third of the diameter of the vessel. A second particulate material with an equivalent diameter De greater than 10 mm fills the part of the end wall situated above the gas distributor, at least to a height corresponding to the upper end of said support.

The combination of these features in a single element makes it possible to have a system that is both mechanically secure for supporting the weight of the materials and the stresses associated with the circulation of the fluids and favorable to achieving optimal performance via the proper distribution of the fluids and the reduction of dead volumes.

Finally, another subject of the present invention is a unit for purifying or separating gases by adsorption of the PSA or TSA type, comprising at least one adsorber employing a gas distribution device according to the invention.

The process of the TSA (temperature swing adsorption) type will be for example purification of synthesis gases before cryogenic separation, of natural gas, these processes generally taking place under pressure (>30 bar) with a high regeneration temperature (200° C.).

In the case of a process of the PSA (pressure swing adsorption) type, the mechanical fatigue of the equipment will be brought about by the rapid variations in pressure (PSA H2, VSA O2, VPSA O2, etc.).

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A gas processing vessel of cylindrical shape with a vertical axis, comprising a cylindrical shell, the cylindrical shell having a shell diameter DR, an upper end wall, a lower end wall, an inlet orifice, an outlet orifice, a gas distribution device and a first particulate material, the distribution device being fixed in said vessel next to the gas inlet or outlet orifice and is recessed into the lower end wall, the distribution device comprising:
   a gas-permeable cover covering said inlet or outlet orifice and having a wall with a substantially circular base, the gas-permeable cover having cover openings, the cover being designed to be in contact without a weld with the lower end wall and having a diameter greater than or equal to one third of the shell diameter,
   a second particulate material with an equivalent diameter De greater than or equal to 10 mm and greater than the dimensions of the cover openings, the second particulate material being accommodated around the cover at least to a height corresponding to an upper end of the cover, and
   a means for centering the cover above the inlet or outlet orifice, said means being fixed to a pipe that is connected to the inlet or outlet orifice,
   wherein the centering means is made up of a rod, an upper end of which is fixed to the cover, and of a means for maintaining said rod at a center of the pipe.

2. The gas processing vessel as claimed in claim 1, wherein the second particulate material has an equivalent diameter De greater than or equal to 25 mm.

3. The gas processing vessel as claimed in claim 1, wherein the second particulate material is accommodated above the cover at least to a height greater than or equal to the height of the cover plus 50 mm.

4. The gas processing vessel as claimed in claim 1, wherein the cover is:
   either in the form of a cone,
   or in the form of a spherical cap,
   or in the form of a truncated cone with the face facing the inlet or outlet orifice being substantially horizontal,
   or in the form of a cylinder with the face facing the inlet or outlet orifice being substantially horizontal.

5. The gas processing vessel as claimed in claim 1, wherein the contact between the cover and the lower end wall is achieved along at least 50% of a length of the base of the cover.

6. The gas processing vessel as claimed in claim 1, wherein the cover has:
   a variable percentage of perforation with a percentage that can vary between 0 and 60% depending on the location on a cover, or
   a constant percentage chosen between 5 and 40%.

7. The gas processing vessel as claimed in claim 1, wherein the cover is covered with a metal lattice made up of a grating surmounted by a gas-permeable flexible metal gauze.

8. The gas processing vessel as claimed in claim 1, wherein said device comprises a deflector positioned in a horizontal position in a free volume between the cover and the lower end wall of the vessel.

9. The gas processing vessel as claimed in claim 8, wherein said device comprises a free space between the deflector and the cover.

* * * * *